Dec. 4, 1956     R. R. McAUSLAN     2,773,114
BATTERY SEPARATOR AND METHOD OF MAKING SAME
Filed Aug. 31, 1954

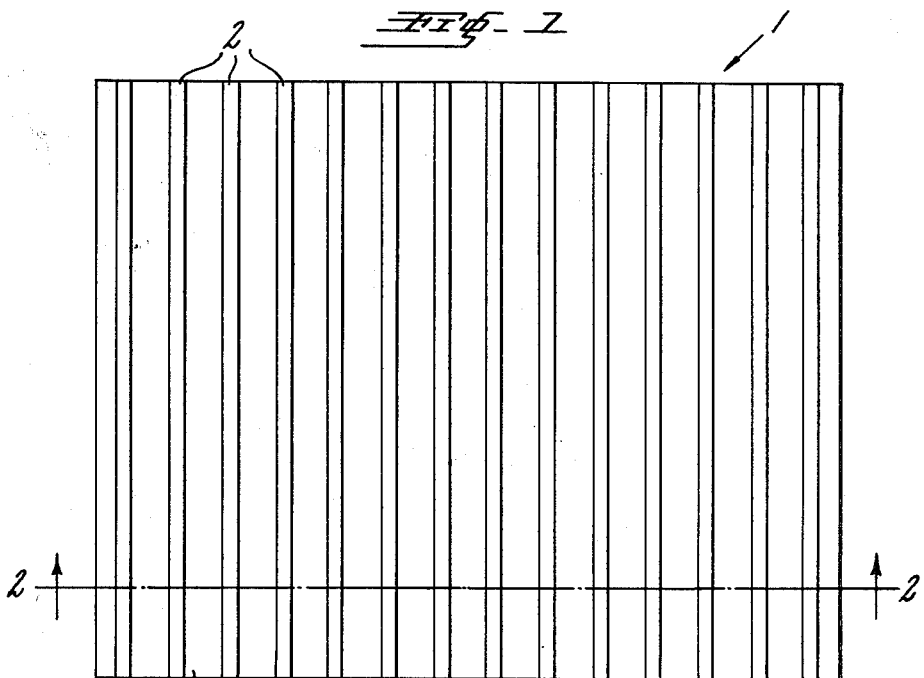

LIQUID PERMEABLE BATTERY SEPARATOR OF CELLULOSIC FIBROUS SHEET IMPREGNATED WITH C-STAGE PHENOL-FORMALDEHYDE RESIN AND CONTAINING A WETTING AGENT COMPOSED OF A POLYPROPYLENE GLYCOL OR A CONDENSATION PRODUCT OF ETHYLENE OXIDE WITH A POLYOXYPROPYLENE BASE, APPLIED WITH THE A-STAGE RESIN

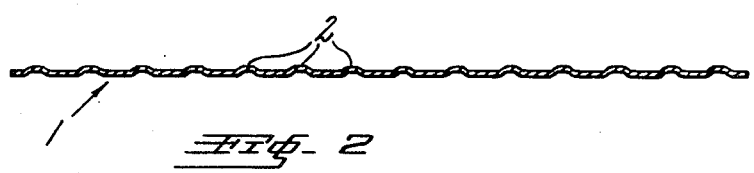

INVENTOR.
ROBERT R. McAUSLAN
BY
Robert J. Patterson
ATTORNEY

United States Patent Office 2,773,114
Patented Dec. 4, 1956

2,773,114

BATTERY SEPARATOR AND METHOD OF MAKING SAME

Robert R. McAuslan, Cranston, R. I., assignor to United States Rubber Company, New York, N. Y., a corporation of New Jersey Application August 31, 1954, Serial No. 453,332

10 Claims. (Cl. 136—146)

This invention relates to an improvement in the art of liquid permeable battery separators and more particularly in phenol-formaldehyde resin-impregnated cellulosic fiber sheet battery separators of the type generally exemplified by U. S. patents to Uber 2,543,137, Uhlig et al. 2,662,106, and Uhlig et al. 2,662,107.

The object of this invention is to produce a dry battery separator having properties which make it adaptable for either wet lead-acid or so-called "dry charged" lead-acid batteries. As is well known, battery separators must absorb battery acid rapidly in order that the electrical resistance of the separator be within a workable range within approximately ten minutes after addition of battery acid. The separators with which the present invention is particularly concerned are of the type made by saturation of a permeable high alpha cellulose in sheet with a solution of an A-stage phenol-formaldehyde resin, this resin being subsequently changed to the insoluble, infusible C-stage by the application of heat in known manner.

I have discovered that many advantages are achieved in the manufacture of battery separators by incorporating a nonionic surface active agent which is either a polypropylene glycol or a condensation product of ethylene oxide with a polyoxypropylene base in the separators at any time prior to their ultimate use. I have found that these particular wetting agents are so stable that they withstand high temperatures used in manufacturing the separators, for example for advancing the phenolic resin to the C-stage without loss of any of their excellent wetting properties. Separators made in accordance with my invention have rapid absorption characteristics and low electrical resistance in battery acid. The uniformity with which the battery acid is absorbed by my separators is outstanding. The resistance of the separators to oxidation loss is not affected by the wetting agents used in accordance with my invention. Many other advantages of my invention will become apparent hereinafter.

The nonionic surface active agents used in my invention are selected from the group consisting of polypropylene glycols and condensation products of ethylene oxide with a polyoxypropylene base.

The polypropylene glycols which can be used in my invention are made by simply condensing propylene glycol in known manner and have a molecular weight of at least 1250. Examples of commercially available polypropylene glycols are "Polyglycol P-2000" (mol. wt. 2000) made by Dow Chemical Co. and "Polypropylene Glycol 2025" (mol. wt. 2025) made by Carbide and Carbon Chemicals Corp.

Similarly the condensation products of ethylene oxide and a polyoxypropylene base used in my invention are well-known materials. The proportion of ethylene oxide to the polyoxypropylene base in these products may be varied over a wide range. The molecular weight of the condensation products may also vary over a wide range. I prefer to use those condensation products which contain up to 60 percent of combined ethylene oxide and at least 40 percent of combined polyoxypropylene base and which have a molecular weight of from 890 to 3600. Wetting agents of this type are sold commercially under the trade name "Pluronics" by Wyandotte Chemicals Corporation of Wyandotte, Michigan. They are described in a trade booklet entitled "Pluronics—a New Series of Nonionic Surface Active Agents" issued in June 1953 by Wyandotte Chemicals Corporation. For a more detailed description of the manufacture of these surface active agents, see U. S. patent to Lundsted No. 2,674,619. These wetting agents are prepared by reacting a polyoxypropylene base, typically having a molecular weight of from 800 to 2,500, with ethylene oxide to form compositions varying in molecular weight and in ratio of propylene oxide to ethylene oxide units. The structure of these compositions is as follows:

$HO(C_2H_4O)_a(C_3H_6O)_b(C_2H_4O)_cH$ where $a$ and $c$ denote the number of ethylene oxide units and $b$ denotes the number of propylene oxide units.

The amount of the wetting agent used in practicing my invention can range from as little as 0.025 to as much as 2.5% by weight based on the dry finished separator. In making a phenol-formaldehyde resin-impregnated cellulosic sheet separator in accordance with my invention the amount of the wetting agent can range from as little as 0.1 to as much as 5% by weight based on the non-volatile resin solids content of the impregnating solution, which is substantially the same as the C-stage phenol-formaldehyde resin content of the finished separator. However, I prefer to employ amounts equal to from 0.5 to 2.5% by weight based on the non-volatile resin solids content of such separators.

In the typical practice of my invention I take a bibulous cellulosic fibrous sheet containing at least 90% of alpha cellulose, having an air permeability (Gurley) of from 4 to 19 seconds (using a 5 ounce cylinder and a ¼ square inch orifice) and also exhibiting uniform "formation," and impregnate it with a solution of the phenol-formaldehyde resin and the wetting agent in such a way that from 20 to 50% by weight of C-stage resin, based on the dry cured sheet, is introduced into the sheet in such a way that when the resin is cured the fibers are protected against battery acid but the air permeability of the sheet is not materially lowered. I then dry the sheet, form ribs therein if desired, and cure the sheet, typically at 300–600° F., to advance the phenolic resin to the C-stage. I can form the ribs by the embossing procedure shown in Uhlig et al. 2,662,106 in which case I prefer to dry the sheet so that it contains 10–25% of volatiles and to then form therein protuberant ribs on one side with corresponding depressed portions on the other side by passing the sheet at this volatile level through cold embossing equipment. Alternatively I can apply ribs of a paste material in accordance with copending application of Sillcox et al. Serial No. 433,208 filed May 28, 1954, these ribs of paste being applied to the flat sheet and subsequently hardened at the time of curing of the phenolic resin in the sheet. Or ribs can be formed in any other suitable way.

In making a phenol-formaldehyde resin-impregnated cellulosic sheet separator by the typical procedure described above I employ as a solvent for the A-stage resin any volatile normally liquid organic solvent capable of dissolving the resin and the wetting agent to form a homogeneous solution. Examples of solvents are: alkanols having up to four carbon atoms per molecule, such as methanol, ethanol, isopropanol or butanol, acetone, miscible mixtures of such alkanols with water and mixtures of acetone with water. It is essential that the A-stage resin and the wetting agent dissolve in the solvent to form a single-phase solution. Although I can use the absolute alkanols to dissolve the resin, for reasons of economy I prefer to use the commercially available forms of the alkanols which contain a small proportion of water. I often prefer to use added water in admixture with the alkanol or acetone to dissolve the resin and the wetting agent. It will be understood that the A-stage phenolic resins as supplied by the manufacturer contain considerable amounts of water so that there would be no reason for using absolute alkanols to dissolve the resins.

The thickness of the original fibrous sheet can vary widely, typically ranging from 0.015 to 0.06". The sheet is used in a normally dry condition, generally containing from 2 to 10% by weight of water. The sheet must exhibit uniform "formation," a term used in the paper industry to denote uniformity of fiber distribution and homogeneity of structure. This is very important since a sheet may be satisfactory in all other respects but if it is deficient in formation it will not give a satisfactory battery separator.

I can use any A-stage phenol-formaldehyde resin which is soluble in the solvent to give a solution containing from 13 to 50% by weight of non-volatile resin solids and which possesses adequate resistance to battery acid when cured to the C-stage. Those skilled in the phenol-formaldehyde resin art can readily prepare such a resin. Many such resins are well-known in the art, examples being those sold as "Durez 16056" and "Resinox 468."

The impregnation of the sheet is typically accomplished by first saturating it thoroughly by simply passing it through a bath of the resin solution containing the wetting agent, followed by passage through ordinary squeeze rolls to remove excess solution and leave in the sheet an amount of solution ranging from 120 to 250 percent based on the weight of the dry fiber, which amount is sufficient upon drying and curing to leave resin in the cured sheet in an amount equal to from 20 to 50 percent by weight based on the weight of dry fiber plus resin plus wetting agent, i. e., based on the dry cured sheet. Because of the highly absorbent nature of the sheet, it will absorb a quantity of the solution in excess of that required so that squeezing to remove the excess is required. Care should be taken in the squeezing step to limit the squeezing pressure so as to not injure the physical properties of the fibrous web.

For the manufacture of separators of the type with which my invention is particularly concerned, attention is directed to the aforementioned Uhlig et al. Patent Number 2,662,106, which is hereby incorporated by reference. My invention is typically practiced in the same manner as is shown in this patent, all of the wetting agent of my invention being incorporated in the impregnating resin solution. No further addition of wetting agent or post-application of wetting agent is required.

Separators of the phenolic-resin impregnated cellulose sheet type made by my invention have the following advantages over battery separators of this general type made by prior art practice:

A. Uniformity of absorption of battery electrolyte. Battery separators made from a porous cellulosic sheet saturated with phenolic resin solution and containing a nonionic surface active agent of the type used in my invention show a high degree of uniformity of absorption of battery electrolyte. The basic reason for this is that the wetting agent is uniformly dispersed in the saturating solution and then applied to the porous sheet of uniform formation and then squeezed to a definite wet pickup in the saturator. Each fiber is uniformly coated with resin and wetting agent and uniform wetting results. There is a definite advantage in this method as compared with the two stage method of applying the wetting agent, as shown in Uhlig et al. 2,662,032 and 2,662,107 because a second application of wetting agent requires long standing to secure even distribution thereof and because the post-application introduces the extra expense of supplemental drying.

B. Rapid wettability by or absorption of battery electrolyte which is particularly important in "dry charged" batteries. As is well-known, "dry charged" batteries comprise bone dry plates and separators which are prepared for use by addition of battery acid immediately before placement in service and require no further charging. Rapid wetting by battery acid is essential with such batteries to insure their ability to deliver the high amperage necessary for starting shortly after addition of the acid. Separators made in accordance with the preferred practice of my invention, i. e., containing the aforementioned wetting agents at the preferred concentration of from 0.5 to 2.5% based on dry resin content show extremely rapid absorption of battery acid. In one series of tests the separators were soaked for 10 minutes and for 24 hours in battery acid. Another series of tests was run to determine absorption of water using the standard ASTM D-824-47 test to determine absorption rates. These tests showed that separators made by my invention are ideally suited for the "dry charged" batteries.

Battery separators made by my invention give electrical resistance values under 0.05 ohm per square inch after ten minutes' immersion in battery acid, and this is ideal for a "dry charged" battery. In addition, the finished separators are dry so that they can be used directly in "dry charged" batteries, as will be brought out under C.

C. The separators of my invention are dried completely during the curing stage and require no post-application of wetting agent and therefore no re-drying. Thus the cost of re-drying separators which have been treated with post-applied solutions of wetting agents is eliminated. The re-drying of wet separators treated with conventional wetting agents, such as, for example, the alkali metal salts of sulfated fatty alcohols sold commercially under the trademark "Tergitol," is a long time operation as low drying temperatures must be used to avoid decomposition of the wetting agent.

D. The separators of my invention produce a battery which has low positive plate shedding as compared to conventional battery separators of this general type which require a wetting agent. Tests show that my separators are far superior to separators containing previously used wetting agents such as the alkali metal salts of sulfated alcohols and dioctyl sodium sulfosuccinate which have been heretofore applied by a two-stage process or by post-application only, in regard to positive plate shedding or loosening of the positive plate material.

E. The cost of wetting agent in the practice of my invention is cut approximately in half because the wetting agent is required only at the impregnating stage and because relatively low amounts thereof are adequate. In addition, the wetting agents used in my invention are considerably less expensive per pound than previously used wetting agents, considered on the basis of 100% wetting agent, i. e., on a dry basis.

F. The chemical resistance or oxidation resistance of battery separators made in accordance with my invention is not adversely affected even though wetting by penetration of an oxidizing acid, namely, the acid used in the oxidation test, is enhanced.

In Fig. 1 of the drawings, 1 designates a resin-impregnated cellulosic sheet separator made in accordance with the present invention, and 2 denotes the integral embossed ribs thereof.

*Example I*

A cotton linters pulp sheet of 0.015" to 0.06" thickness, a Gurley porosity of 4 to 19 seconds (using a five ounce cylinder and a ¼ square inch orifice) and of uniform formation is saturated in a solution composed of the following:

| | Parts by weight |
|---|---|
| "Durez 16056" (phenol-formaldehyde resin, water-soluble, with a water dilutability, as purchased, of from 3:1 to 8:1, 70% non-volatiles) | 1575 |
| Isopropanol (91% isopropyl alcohol, 9% water) | 1200 |
| Water | 359 |
| "Pluronic L64" (ethylene oxide 20–30%—polypropylene oxide 80–70%, molecular weight 2500–3600, 100% strength) | 20 |

The resin solution contains approximately 35% by weight of resin solids, considering that the resin as purchased contained 70% solids.

The sheet is impregnated and processed into finished cured separators in the manner shown in Uhlig et al. 2,662,106.

*Example II*

Example I is duplicated exactly except that the "Pluronic L64" is replaced with an equal weight of "Polypropylene Glycol 2025" (mol. wt. 2025).

The separators made by Examples I and II were eminently satisfactory and had all of the advantages set forth above. They had outstanding chemical, electrical and mechanical properties, in addition to superior uniformity and rapidity of wetting in battery acid, and easily met the rigid specifications imposed on a separator which is to compete with Douglas fir separators. They had an electrical resistance of 0.03–0.045 ohm per square inch in battery acid.

From the foregoing it will be seen that my invention provides an improved battery separator which exhibits outstanding wettability by battery acid and it also provides a simple and commercially feasible method of making such a separator. My invention provides for elimination of further application of wetting agent to cured separators of the resin-impregnated cellulosic sheet type and makes it possible to obtain such separators without going through an additional drying operation. Separators made by my invention are satisfactory in performance after ten minutes immersion in battery acid. My separators do not need to be conditioned, i. e., allowed to stand, prior to installation in the battery. The necessity of allowing the finished separators of my invention to stand to obtain good distribution of the wetting agent throughout all portions of the separators is obviated because the wetting agent is distributed as uniformly as the resin as a result of incorporation of the wetting agent in the impregnating resin solution. Furthermore all of the water has been removed by the end of curing so that standing of the finished separators would serve no purpose. Using my separators, the batteries can be assembled dry and kept dry indefinitely before addition of the battery acid. My separators are equally applicable for both wet and "dry charged" installations.

Although I have described my invention with particular reference to a separator made from a high alpha cellulose bibulous sheet, I can in the broader aspects of my invention apply my wetting agents in the manufacture of liquid permeable battery separators generally and thereby attain unexpected advantages over prior art practice. For example, I can include my wetting agents in polyvinyl chloride separators, separators based upon combinations of glass fiber, diatomaceous earth and binders, separators based on a fibrous sheet impregnated with resins other than phenol-formaldehyde resins, separators based upon combinations of glass and cellulosic fibers, hard rubber separators, or any other type of battery separator which without a wetting agent is difficulty wettable after drying. In all separators of this type the inclusion of my wetting agents during manufacture in such a way that the finished separator contains the wetting agent results in certain advantages which are extremely important and could not have been forseen, namely:

1. Battery plates formed in the presence of separators containing my wetting agents are more rugged and freer from the tendency to shed the active material than plates formed in the presence of separators containing the usual wetting agents.

2. Separators made with my wetting agents retain their wettability after being subjected to relatively high temperatures, for example temperatures of the order of 250° to 600° F., whereas separators made with wetting agents according to prior practice do not retain their wettability after being subjected to such temperatures and therefore require additional application of wetting agent and subsequent costly low temperature drying. This advantage of my invention is extremely important because it enables the separators containing my wetting agents to be subjected to high temperatures during their manufacture or subsequent use. For example, in the manufacture of separators of the type described in detail herein, this advantage enables the introduction of the wetting agent with the impregnating resin solution and obviates loss of wettability during subsequent high temperature curing of the resin. Similarly, in making other types of separators, this advantage makes it possible to incorporate the wetting agent in advance of a high temperature processing step.

Instead of incorporating my wetting agents in the impregnating resin solution, I can apply them to the finished separators by simply immersing the separators in, or spraying them with, a solution of the wetting agents followed by standing (to allow thorough distribution) and drying to remove the solvent.

All electrical resistance values given herein were determined in the manner described in the industry bulletin titled, "A Method for Measuring the Electrical Resistance of Battery Separators" published in February 1953 by the United States Rubber Company.

Having thus described my invention, what I claim and desire to protect by Letters Patent is:

1. A liquid permeable battery separator made from a bibulous cellulosic fibrous sheet having an air permeability (Gurley) of from 4 to 19 seconds (using a 5 ounce cylinder and a ¼ square inch orifice), having an alpha cellulose content of at least 90 percent and exhibiting uniform "formation" thoroughly impregnated with an intimate mixture of a C-stage phenol-formaldehyde resin formed by curing an A-stage phenol-formaldehyde resin uniformly deposited in and around the fibers of the sheet by drying from solution in a solvent therefor, said C-stage phenol-formaldehyde resin being in intimate admixture with a nonionic surface active agent selected from the group consisting of polypropylene glycols having a molecular weight of at least 1250 and the products of condensation of ethylene oxide with a polyoxypropylene base, said products of condensation containing up to 60 percent of ethylene oxide and at least 40 percent of a polyoxypropylene base and having a molecular weight of from 890 to 3600, in amount equal to from 0.1 to 5 percent by weight based on the weight of said C-stage phenol-formaldehyde resin.

2. A separator as set forth in claim 1 wherein the amount of said surface active agent is equal to from 0.5 to 2.5 percent by weight based on the weight of said C-stage phenol-formaldehyde resin.

3. A separator as set forth in claim 1 wherein said surface active agent is a polypropylene glycol having a molecular weight of at least 1250.

4. A separator as set forth in claim 1 wherein said surface active agent is a condensation product of up to 60 percent of ethylene oxide and at least 40 percent of a polyoxypropylene base and has a molecular weight of from 890 to 3600.

5. The process of making a liquid permeable battery separator which comprises thoroughly impregnating a normally dry bibulous cellulosic fibrous sheet having an alpha cellulose content of at least 90 percent and an air permeability (Gurley) of from 4 to 19 seconds (using a 5 ounce cylinder and a ¼ square inch orifice) and exhibiting uniform "formation" with a solution of an A-stage phenol-formaldehyde resin in a volatile normally liquid organic solvent therefor, said solution having dissolved therein a nonionic surface active agent selected from the group consisting of polypropylene glycols having a molecular weight of at least 1250 and the products of condensation of ethylene oxide with a polyoxypropylene base, said products of condensation containing up to 60 percent of ethylene oxide and at least 40 percent of a polyoxypropylene base and having a molecular weight of from 890 to 3600, in amount equal to from 0.1 to 5 percent by weight based on the non-volatile resin solids content of the solution, said solution containing non-volatile resin solids in a concentration of from 13 to 50 percent by weight, and thereby causing said sheet to pick up from 120 to 250 percent by weight of said solution based on the fiber, drying said sheet and thereby depositing in and around the fibers of the sheet said resin in an amount corresponding to from 20 to 50 percent by weight of C-stage resin based on dry cured sheet, said resin being in admixture with said surface active agent, said resin being so distributed that upon conversion to the C-stage it will protect said fibers against attack by battery acid but will not lessen materially the air permeability of the sheet, heating the dried sheet to advance said resin to the C-stage, and cutting the resulting sheet into battery separators.

6. A process as set forth in claim 5 wherein the amount of said surface active agent is equal to from 0.5 to 2.5 percent by weight based on the non-volatile resin solids content of said solution.

7. The process of claim 5 wherein said surface active agent is a polypropylene glycol having a molecular weight of at least 1250.

8. The process of claim 5 wherein said surface active agent is a condensation product of from up to 60 percent of ethylene oxide and at least 40 percent of a polyoxypropylene base and has a molecular weight of from 890 to 3600.

9. A liquid permeable battery separator containing a nonionic surface active agent selected from the group consisting of polypropylene glycols having a molecular weight of at least 1250 and the products of condensation of ethylene oxide with a polyoxypropylene base, said products of condensation containing up to 60% of ethylene oxide and at least 40% of polyoxypropylene base and having a molecular weight of from 890 to 3600, said surface active agent being present in an amount from 0.025% to 2.5% by weight based on the dry finished separator.

10. The process of making a liquid permeable battery separator which comprises incorporating therein during the manufacture thereof a surface active agent selected from the group consisting of polypropylene glycols having a molecular weight of at least 1250 and the products of condensation of ethylene oxide and a polyoxypropylene base, said products of condensation containing up to 60% of ethylene oxide and at least 40% of a polyoxypropylene base and having a molecular weight of from 890 to 3600, said surface active agent being present in an amount from 0.025% to 2.5% by weight based on the dry finished separator.

References Cited in the file of this patent

UNITED STATES PATENTS

| | | |
|---|---|---|
| 2,662,032 | Uhlig et al. | Dec. 8, 1953 |
| 2,662,107 | Uhlig et al. | Dec. 8, 1953 |

OTHER REFERENCES

Industrial and Engineering Chem., vol. 33 (January 1941), pp. 16–22.